(12) United States Patent  
Christ et al.

(10) Patent No.: US 8,131,604 B2  
(45) Date of Patent: Mar. 6, 2012

(54) INTERNAL ROUTING

(75) Inventors: Thomas Christ, Kronall (DE); Stefan Grabowski, Osphofen (DE)

(73) Assignee: SAP Aktiengesellschaft, Walldorf (DE)

( * ) Notice: Subject to any disclaimer, the term of this patent is extended or adjusted under 35 U.S.C. 154(b) by 1909 days.

(21) Appl. No.: 11/251,404

(22) Filed: Oct. 14, 2005

(65) Prior Publication Data

US 2007/0088631 A1   Apr. 19, 2007

(51) Int. Cl.  
*G06Q 10/00* (2006.01)

(52) U.S. Cl. ............ 705/28; 705/7; 705/8; 705/22; 705/26; 705/27; 705/29; 705/35; 233/375; 233/376; 233/383; 233/384; 233/385

(58) Field of Classification Search ............ 705/28  
See application file for complete search history.

(56) References Cited

U.S. PATENT DOCUMENTS

| | | | |
|---|---|---|---|
| 7,406,472 B2 | 7/2008 | Manucha et al. | |
| 2002/0019759 A1* | 2/2002 | Arunapuram et al. | 705/7 |
| 2003/0172200 A1* | 9/2003 | Chen et al. | 710/3 |
| 2004/0153379 A1* | 8/2004 | Joyce et al. | 705/28 |
| 2004/0193502 A1* | 9/2004 | Heitner et al. | 705/26 |
| 2004/0267640 A1* | 12/2004 | Bong et al. | 705/28 |
| 2006/0163338 A1 | 7/2006 | Allen et al. | |
| 2007/0005181 A1 | 1/2007 | Stingel, III et al. | |

OTHER PUBLICATIONS

Olavarrieta, Sergio Ellinger, Alexander E. Resource-based theory and strategic logistics research, International Journal of Physical Distribution & Logistics Management , v27n9/10 , p. 559-587 , 1997.*

* cited by examiner

*Primary Examiner* — F. Zeender  
*Assistant Examiner* — Fawaad Haider  
(74) *Attorney, Agent, or Firm* — Blakely, Sokoloff, Taylor & Zafman LLP

(57) ABSTRACT

Methods and apparatus provide for routing goods from a source location to a final destination through an intermediate location. An intermediate warehouse task or transfer order is generated with reference to the movement of the goods to the intermediate location rather than movement to the final destination. A routing table can provide information for generating the intermediate warehouse task. A routing path that indicates the intermediate location can correspond to a location determined by a layout-oriented routing path or a process-oriented routing path.

15 Claims, 10 Drawing Sheets

INTERNAL ROUTING

FIELD

Embodiments of the invention relate to warehouse management, and more particularly to routing of goods within a warehouse.

BACKGROUND

A warehouse may have multiple locations or nodes. The locations may be used for processing, or performing some operation on goods. For example, a warehouse may have a shipping and receiving area and a storage area. Additionally, a warehouse may include one or more locations for operations such as: counting, picking, bundling, painting, assembling, etc. Routing of goods in a warehouse may include, and/or be directed by generation of one or more documents or routing controls in a routing manager. For example, a transfer order or other routing document may be used to direct or indicate the movement of goods from one location in the warehouse to another. Traditional routing of goods included the use of a single transfer order, or other move operation or warehouse task that would accompany the goods from the starting location to the ending location (e.g., receiving to storage for goods receipt, storage to shipping for shipments). The single transfer order may accompany the goods without regard to the routing path. The use of a single transfer order made movement of goods inflexible, and difficult to provide detailed tracking or correction of routing errors.

SUMMARY

Methods and apparatus may provide for routing of goods in a warehouse from a source location to a final destination in the warehouse. Goods may be routed to the final destination through an intermediate location. Goods may be associated with a warehouse task or transfer order that indicates the routing of the goods. A group of goods may be associated with the warehouse task indicating the move to the intermediate location rather than with an original warehouse task indicating the move from the source to the final destination.

BRIEF DESCRIPTION OF THE DRAWINGS

The following description includes discussion of various figures having illustrations given by way of example of implementations of embodiments of the invention. The drawings should be understood by way of example, and not by way of limitation.

DETAILED DESCRIPTION

As used herein, references to one or more "embodiments" are understood as describing a particular feature, structure, or characteristic included in at least one implementation of the invention. Thus, phrases such as "in one embodiment" or "in an alternate embodiment" appearing herein describe various embodiments and implementations of the invention, and do not necessarily all refer to the same embodiment. However, they are also not necessarily mutually exclusive. Descriptions of certain details and implementations follow, including a description of the figures, which may depict some or all of the embodiments described below, as well as discussing other potential embodiments or implementations of the inventive concepts presented herein.

Figure 1:
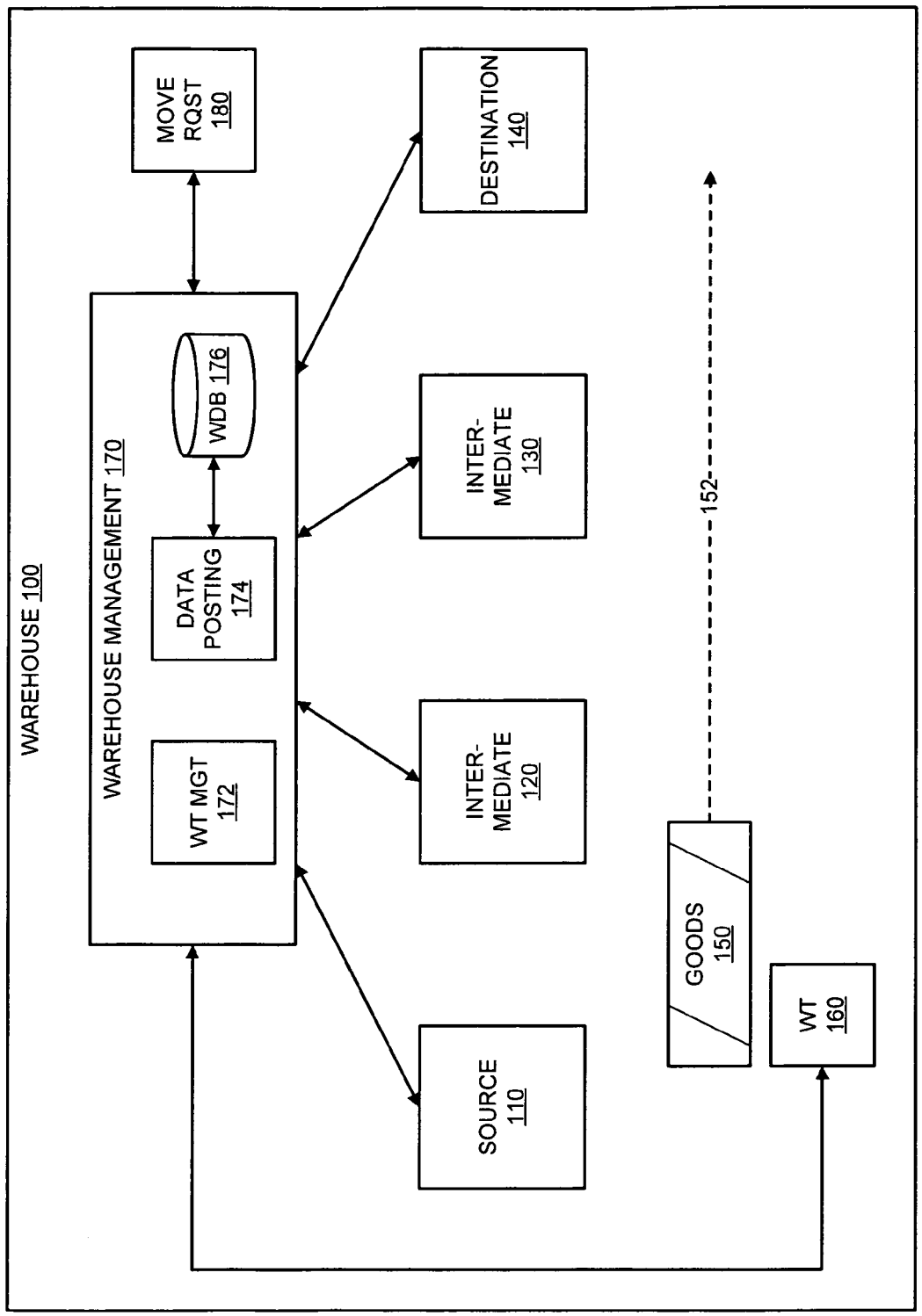
FIG. 1 is a block diagram of an embodiment of a warehouse with warehouse management.

FIG. 1 is a block diagram of an embodiment of a warehouse with warehouse management. Warehouse 100 represents one or more physical structures that make up a storage and/or distribution facility. The one or more physical structures may refer to partitions of a building, or may refer to multiple buildings, whether or not physically interconnected. In one embodiment warehouse 100 has a decentralized management structure/environment. A decentralized management structure refers herein to an environment where multiple entities or management modules, whether hardware and/or software, operate in conjunction to provide routing control. Decentralized management may not have all control logic in a single location or a single program, and multiple modules may work together to move goods from one location to another.

Warehouse management 170 represents a decentralized warehouse control module, which may include warehouse task (WT) management module 172, data posting module 174, and/or warehouse database (WDB) 176, among other possible modules. Thus, warehouse management 170 may include more or fewer modules or components than what is depicted. WT management module 172 represents one or more components that enable warehouse management 170 to generate or create warehouse tasks (WTs), which may also be referred to as transfer orders (TOs), including filling the WT with information. As used herein, transfer order or warehouse task may refer to a document (e.g., an electronic document) relating to movement of goods in a warehouse. A WT may be associated with specific goods, and in one embodiment multiple WTs may be generated for particular goods. WT management 172 can also enable warehouse management 170 to update WTs, compare information in a WT to data available about a system or about associated goods, receive a WT confirmation, suspend or deactivate WTs, activate WTs, etc. Data posting module 174 enables warehouse management 170 to update information stored in a memory, including information from a confirmed WT. Confirmation of a WT will be discussed in more detail below. Data posting 174 may include the ability to provide information to a database and/or from a database or memory to a display. Warehouse database 176 is one example of storage for warehouse management information, including information from WTs, or information with which to build WTs (e.g., to provide data bytes in a document with one or more fields of information). Warehouse database 176 may include volatile (e.g., a type of random access memory (RAM)) and/or non-volatile memory (e.g., flash, read-only memory (ROM), hard drive, etc.).

Warehouse management 170 may receive move request 180. Move request 180 represents any of a type of command or call that directly requests and/or indirectly provides for the movement of goods from one part of a warehouse to another. The command or call may come, for example, from a warehouse management module (either the ones shown or another one not shown), from user input, and/or as part of a called process. Examples of types of activity or events that may involve the movement of goods include, but are not limited to, goods receipt, purchase orders, movement from temporary holding to storage, packaging, picking, movement within storage, etc.

Goods 150 represent any type of goods, products, materials, or items of manufacture. Examples of goods may include anything from screws or faceplates to motors or drive assemblies, or anything in between. The processing that may be performed on each item may differ, depending on the type of goods, even within the same warehouse. For example, batteries could be received, counted, tested, and stored. Door assemblies may be received, counted, checked for uniformity, sanded, painted, and stored. Thus, a routing path 152 may be different, meaning it may follow through different stations within warehouse 100, depending on the type of goods.

One example of a possible routing path 152 is shown beginning with source 110, which represents a beginning or a starting node for a movement of goods 150. When move request 180 is received at warehouse management 170, goods 150 are at location source 110. WT 160 may be generated with respect to goods 150 for movement along routing path 152. In one embodiment movement of goods 152 along routing path 152 is according to a routing plan, meaning an organized schedule of locations through which goods should pass to arrive at final destination 140 when coming from source 110. The organized schedule may be a predetermined sequence of events or locations, which may depend upon a number of factors. The factors may include, but are not limited to, a layout of warehouse 100. The physical mapping of a warehouse may determine that certain locations are necessary for goods 150 to pass to arrive at another location. In one embodiment a layout-driven or layout-oriented routing path may be generated for purposes of scheduling. For example, if goods 150 are received when many of the processing stations within warehouse 100 are in use, goods 150 may need to be routed along a particular path to be processed. The layout-driven routing may include determining whether a particular location or processing station is in use, or can accommodate receiving goods 150.

In one embodiment the layout of warehouse 100 is planned according to an expected sequence of events that will generally be performed on some or all goods. In one embodiment routing path 152 may be based in part or in whole upon a process-driven or process-oriented routing of goods 150. A process-driven routing path may include one that is determined based upon the expected sequence of events for particular goods. For example, as set forth above with respect to batteries and door assemblies, particular events may be scheduled for particular items or classes of items. For example, all bolts, nuts, screws, nails, rivets, etc., may be of a different class of goods than fenders, doors, hoods, and side panels. A different process may exist for the different classes of goods. In one embodiment a master routing plan, or a standard plan or global plan, for routing of particular goods or a class of goods may exist, and certain events within the process may be skipped for a particular shipment or a particular good-type. The process-driven routing may include determining whether a particular location will be used for particular goods. If a particular location is not used, it may in one embodiment be referred to as being "inactive" with respect to the goods. An active location may be one that will be used for the particular goods. A location can be considered to be active or inactive whether referring to a process-driven or a layout-driven routing plan.

In one embodiment a routing path may be determined based in part on a process-driven routing and based in part on a layout-driven routing of the goods. For example, an expected routing path may be specified for goods based on actions to be performed on the goods during routing (process-driven), but then the path may be modified based on layout-associated factors (e.g., activity at a particular station, a temporary unavailability of an area due to error or equipment failure, etc.). Thus, a routing path may be both layout-and process-oriented.

WT 160 may be generated to indicate the movement of goods 150 from source 110 to destination 140. Goods 150 may pass through one or more intermediate locations 120 and 130 in routing from source 110 to destination 140. Intermediate locations 120 and 130 may be any type of processing station, and may include, among others, a goods receipt station, a counting station, a spreading station, a picking station, a packing station, a staging station, etc. Intermediate locations 120 and 130 may be different depending on whether goods are being received or shipped out, upon the type of goods, the routing path or routing plan, the customer or supplier, etc. WT 160 may be associated with goods 150, meaning that the movement of goods 150 are indicated by and/or tracked by WT 160. Traditionally WT 160 would indicate the movement of goods 150 from source 110 to destination 140 and may or may not have indicated intermediate locations 120 and 130, or intermediate events in the routing of the goods.

In one embodiment WT 160 can represent multiple WTs according to embodiments of the invention described herein. Thus, a WT can be generated at each event of routing process 152. For example, a general or original or first WT can be generated to represent the movement of goods 150 from source 110 to destination 140. However, goods 150 may be routed through intermediate locations 120 and 130, and so separate WTs can be generated for the intermediate movements. Thus, an intermediate WT can be generated to represent the movement of goods 150 from source 110 to intermediate location 120, and another intermediate WT can represent the movement of goods 150 from intermediate location 120 to intermediate location 130. Another WT can possibly be generated for the movement from intermediate location 130 to destination 140. Alternatively, the original WT can be suspended or inactivated during the intermediate movements, and reactivated for the move from intermediate location 130 to destination 140. In one embodiment the original WT is updated with each move, and may be reactivated upon recognizing that the next hop in the sequence of routing events is the final destination.

WT 160 may be posted to warehouse management 170, and/or may be stored by warehouse management 170. WT 160 may be stored in volatile or non-volatile memory for purposes of use for movement of goods 150 and/or for record-keeping. Any WT, whether original, intermediate, or final may be posted and/or stored. In one embodiment a WT is confirmed at each event in the routing path. Thus, if a WT is generated for the movement from source 110 to intermediate node 120, the WT may be confirmed upon arrival of goods 150 at intermediate node 120. Goods 150 can be tracked in this manner, verifying that the goods have passed all appropriate locations on routing path 152 and been confirmed prior to receipt of the goods at another location.

Figure 2:
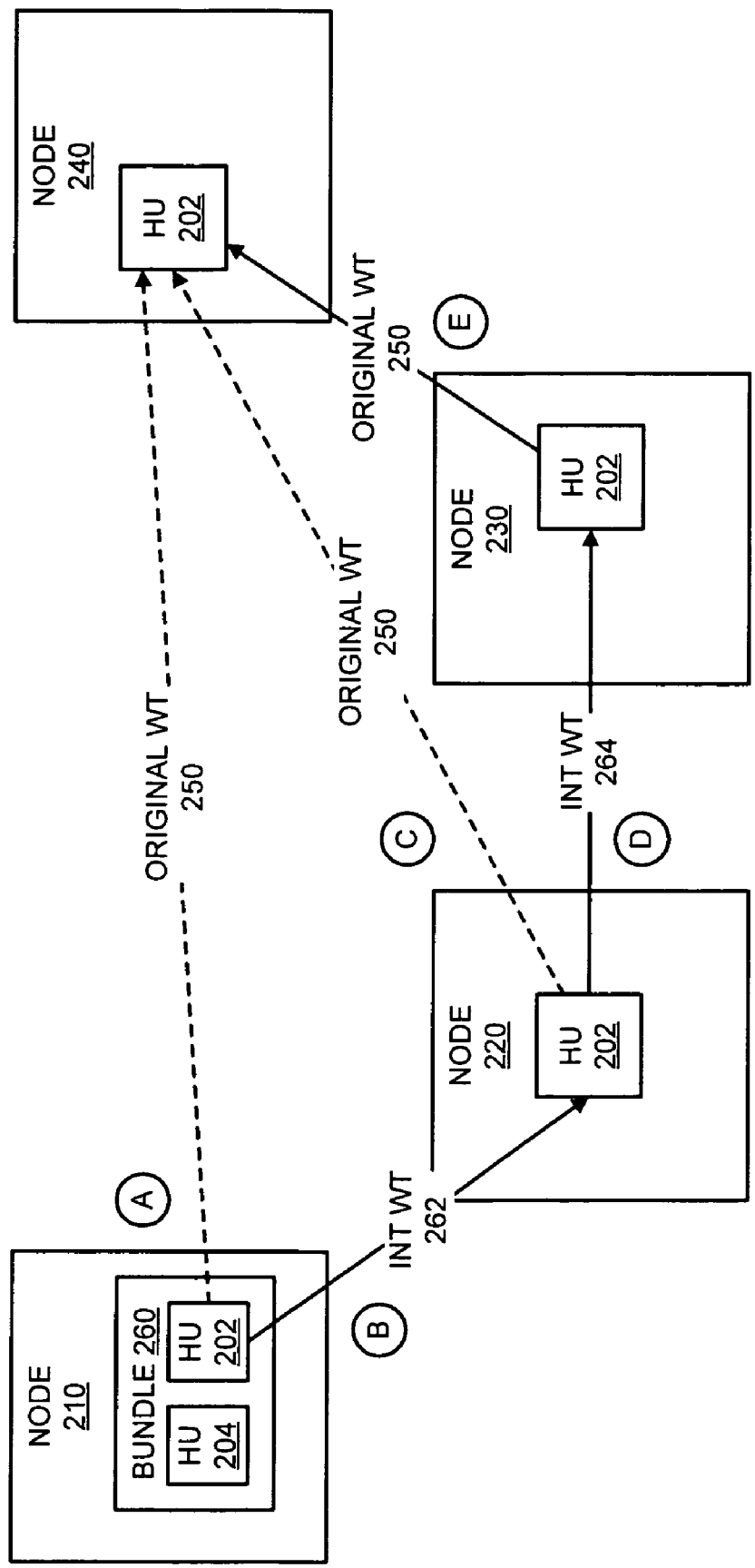
FIG. 2 is a block diagram of an embodiment of routing goods from one warehouse node to another.

FIG. 2 is a block diagram of an embodiment of routing goods from one warehouse node to another. Nodes 210, 220, 230, and 240 are nodes of a warehouse, for example, warehouse 100 of FIG. 1. Node 210 as shown is a starting location, nodes 220 and 230 as shown are intermediate locations, and node 240 as shown is a final destination. Note that in other embodiments of a routing path, the nodes may serve different functions. Node 210 is shown with bundle 260 having handling units (HUs) 202 and 204. HUs 202-204 represent one or more items of a particular good for routing. For example, HU 202 may include a package, a box, or a pallet of knobs. The size of the handling unit may depend upon the particular warehouse, the purpose of the move, the size of an incoming or outgoing shipment, etc. HUs 202-204 are not necessarily homogeneous, although they may be. HUs 202-204 may include a single part type, or all parts for one or more assemblies.

One or more handling units can be combined in bundle 260, which represents a group of goods for movement to a next location in a routing path. In one embodiment bundle 260 consists of one or more of the same kind of handling unit. In one embodiment bundle 260 includes multiple handling units, which may be of varying types, which have a common next location in a routing path. In another embodiment bundle 260 is built for moving from node 210 and stays together along the entire path to final node 240. For purposes of simplicity, HU 202 is shown moving along the routing path alone, to illustrate that one or more handling units (e.g., HU 204) could accompany HU 202 along part or along the whole of the movement on the routing path to node 240.

At A, an original warehouse task (WT) 250 may be generated, indicating the final destination of HU 202 for purposes of the routing path in question. The final destination for goods for purposes of a routing path does not necessarily indicate that the goods will not be moved again in the life of the goods, although it may. Original WT 250 can be associated with HU 202, for example, by an identifier included within original WT 250 identifying HU 202. The identifier can be any identifier known in the art, and may be generated at the warehouse, such as a name or number assigned to a shipment (incoming or outgoing), a bar code, a part number, a radio frequency (RF) identification/identifier (ID), a serial number, etc. Identification of the goods may or may not include a number of the goods.

To move HU 202, a management engine may determine that a routing path for HU 202 does not go directly from node 210 to destination node 240, but has a next routing event at node 220. In one embodiment original WT 250 is generated in an inactive state. An inactive state may refer to a suspended state or a state where a particular document is not usable for an associated task. For example, an inactive WT may be unavailable to warehouse management for operations related to the movement of goods. A WT that is generated inactive can be later activated, for example, upon the satisfying of a condition (e.g., the next destination of the goods is the final destination), or upon some other function or operation of management. In one embodiment only a single WT can be active for a particular HU at any given time. In one embodiment multiple or all WTs that will be used throughout the routing path of goods are generated with an original WT. In the case where multiple WTs are generated simultaneously, the WTs may be selectively activated at various stages of routing or locations along the routing path. Alternatively, an active WT can be deactivated. In one alternative embodiment WTs can be generated as needed. In one embodiment original WT 250 is inactive or deactivated at A, and a WT activated or a new WT generated, intermediate (INT) WT 262, at B. In one embodiment intermediate WT 262 is a modified copy of original WT 250. In another embodiment intermediate WT 262 is generated independently of original WT 250, and possibly by the same WT generation module that generated original WT 250. At node 220, HU 202 may be processed according to the event of node 220. The management engine may determine whether original WT 250 indicating the move to node 240 should be activated. If the routing path for HU 202 indicates another intermediate node, for example, node 230, original WT 250 may remain inactive. In another embodiment original WT 250 is reactivated at each routing event, and deactivated upon determining that the goods have another location to pass through prior to being moved to their final destination.

Thus, at C there may be a determination of whether to activate original WT 250 or a determination of whether to leave original WT 250 deactivated. At D, intermediate WT 264 is generated for the movement of HU 202 from node 220 to node 230, where the goods may be further processed. At E, the management engine may determine that the next event in the routing path is the final destination of HU 202. Thus, in one embodiment original WT 250 becomes or is allowed to remain active for movement of HU 202 to node 240. Original WT 250 may be altered to be updated with information about the routing of the goods that has taken place along the routing path through intermediate nodes 220 and/or 230.

Figure 3:
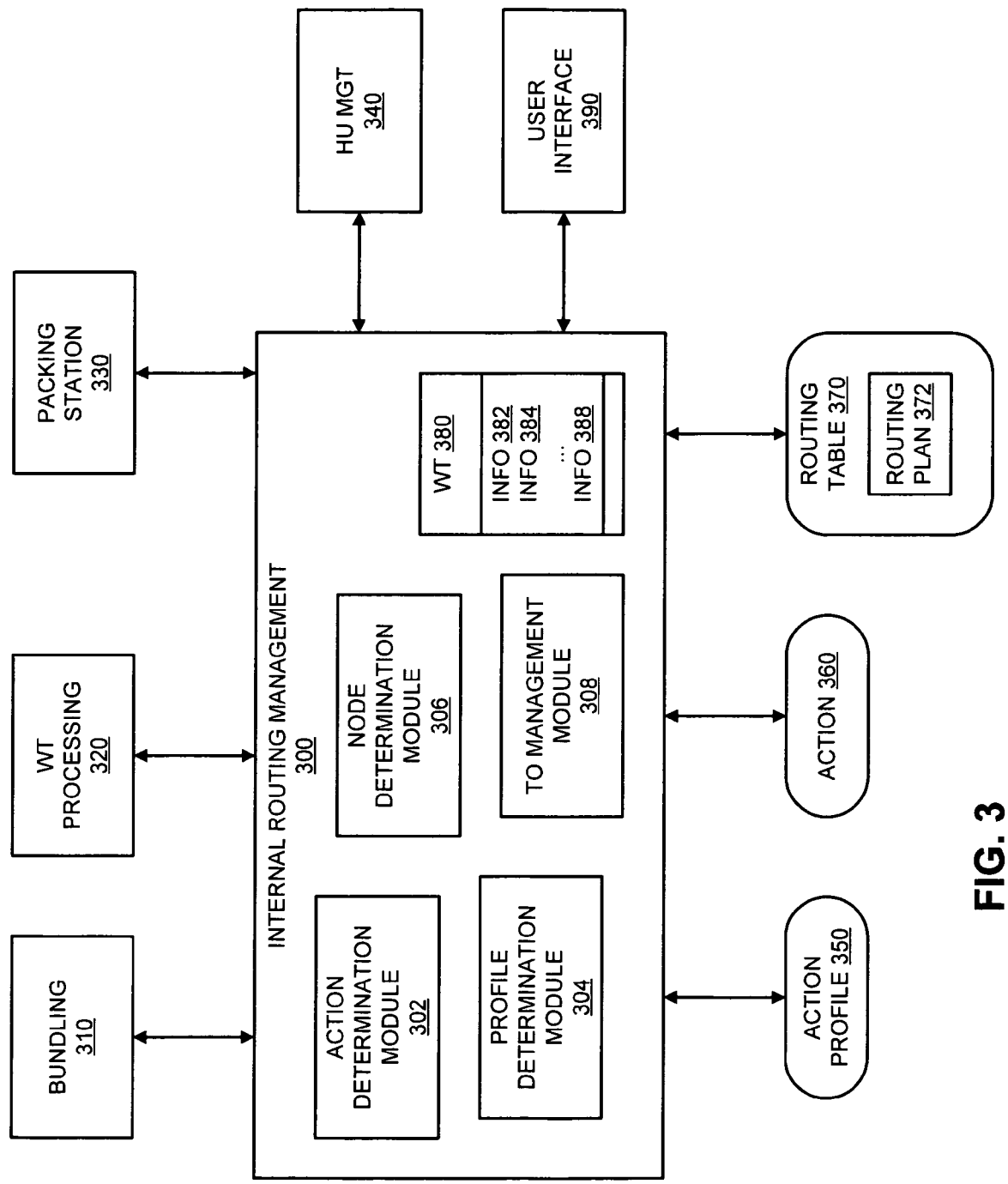
FIG. 3 is a block diagram of an embodiment of warehouse routing management.

FIG. 3 is a block diagram of an embodiment of warehouse routing management. Internal routing management 300 represents one or more elements of warehouse management or routing control as previously described. The modules described may provide functionality to and/or be a part of internal routing management 300. In different embodiments the different modules may exist as functions or subroutines of internal routing management 300, or as modules that interface with internal routing management 300. Example modules include action determination module 302, profile determination module 304, node determination module 306, WT management module 308, and/or modules for bundling 310, WT processing 320, packing station control/interface 330, HU management 340, user interface 390, action profile storage 350, action or operation (e.g., a function that can be performed) 360, and/or routing table 370.

Action determination module 302 may provide the ability for internal routing management 300 to identify and/or assign one or more actions 360 that can be and/or will be performed on goods. In one embodiment action determination module 302 accesses one or more action profiles 350 to determine one or more actions for the goods. Actions 360 may correspond to one or more routing stations or nodes, or one or more routing events. As discussed in more detail below, a node may include one or more routing events. Profile determination module 304 may operate in conjunction with action determination module 302, and may determine a profile for goods to be processed or otherwise acted upon. Profile determination module 304 may also access action profile 350 to determine how to route goods associated with a move request.

Node determination module 306 may determine one or more nodes to which to send goods. As used herein, a node refers to any potential area or station in a warehouse (e.g., a storage type, a work center, a staging area, etc.). For example, as discussed previously, a routing path from a source node to a destination node may include one or more intermediate nodes, each move of which routing may have an associated WT. In one embodiment determining the nodes may include determining that a particular node is not active or not applicable to certain goods, or a certain handling unit (HU). Node determination module 306 may access routing table 370, which may include routing plan 372. Routing table 370 may indicate a path for goods of a particular type, for example, according to a master routing plan. Routing table 370 may indicate routing plan 372 for particular goods or for a particular HU.

WT management module 308 may generate and manage WTs for movement of the goods. WTs may be generated based on information in routing table 370, as well as on actions 360. Additionally, or alternatively, WT management module 308 may generate or populate the fields of a WT for a movement of goods according to a bundling indication in bundling module 310. In one embodiment internal routing management 300 includes a memory (not explicitly shown), which may contain, among other things, WT 380. WT 380 may include various elements of information 382-388. Items/fields/lines of information 382-388 may indicate, for example, a goods identifier, a source and/or destination, a processing type, an associated routing action or event, etc. WT 380 may be temporarily stored in a memory and/or archived for more persistent maintenance. A WT may be generated for each move along a routing path. Thus, various WTs may identify the same goods, and be referring to different locations along the routing path of the goods. In one embodiment each WT is separately generated, and may be generated at each location along the routing path. In another embodiment all WTs are generated in response to a move request, after, or in conjunction with, internal routing management 300 determining a path for the goods.

Bundling module 310 may refer to the ability of internal routing management 300 to determine how and when to generate bundles or create movement groups for the goods. Bundling may refer to separating and/or combining goods.

WT processing module 320 may refer to the ability of internal routing management 300 to route goods with the separate WTs created. Also, with multiple WTs referring to the same goods, internal routing management 300 can distinguish between different routing events for the goods, can track the goods, and/or handle the posting of information on confirmation of a WT when goods arrive appropriately at a processing station.

Packing station 330 may refer to an interface between a packing station and internal routing management 300. The interface allows the coordination of the grouping of goods, and a reflection of the grouping of the goods in WT 380.

In one embodiment HU management module 340 provides management of various handling units, especially the interaction of various HUs with one or more WTs 380. For example, as explained above, goods may be combined to form a routing group that may be a handling unit, or a group identifiable by an identifier and trackable with a WT.

In one embodiment internal routing management 300 includes one or more user interfaces 390 to provide interaction with a warehouse employee or manager. For example, an employee at a routing station may confirm WT 380 for a particular station and thus provide an input to allow the information in WT 380 to be processed and/or stored (e.g., saving or altering information in a memory). A warehouse manager may interact with internal routing management 300 to establish a master routing plan for goods of a particular type, or provide a WT template from which WTs will be generated at various events in a routing path. In one embodiment, in response to a user input, internal routing management 300 may be triggered to compare a WT against routing information gathered from confirmations or other tracking of goods within a warehouse.

The modules may be collectively or individually interconnected. The interconnecting of the modules may be through a bus or other communication medium and/or through the use of application interfaces or function calls. Thus, the modules can be considered to be coupled to one or more other modules through the interconnections.

One or more modules within or associated with internal routing management 300 may include hardware, software, and/or a combination of these. In a case where a module includes software, the software data, instructions, and/or configuration may be provided via an article of manufacture by a machine/electronic device/hardware. An article of manufacture may include a machine accessible/readable medium having content to provide instructions, data, etc. The content may result in an electronic device, for example, a filer, a disk, or a disk controller as described herein, performing various operations or executions described. A machine accessible medium includes any mechanism that provides (i.e., stores and/or transmits) information/content in a form accessible by a machine (e.g., computing device, electronic device, electronic system/subsystem, etc.). For example, a machine accessible medium includes recordable/non-recordable media (e.g., read only memory (ROM), random access memory (RAM), magnetic disk storage media, optical storage media, flash memory devices, etc.), as well as electrical, optical, acoustical or other form of propagated signals (e.g., carrier waves, infrared signals, digital signals, etc.), etc. The machine accessible medium may further include an electronic device having code loaded on a storage that may be executed when the electronic device is in operation. Thus, delivering an electronic device with such code may be understood as providing the article of manufacture with such content described above. Furthermore, storing code on a database or other memory location and offering the code for download over a communication medium via a propagated signal may be understood as providing the article of manufacture with such content described above.

Figure 4:
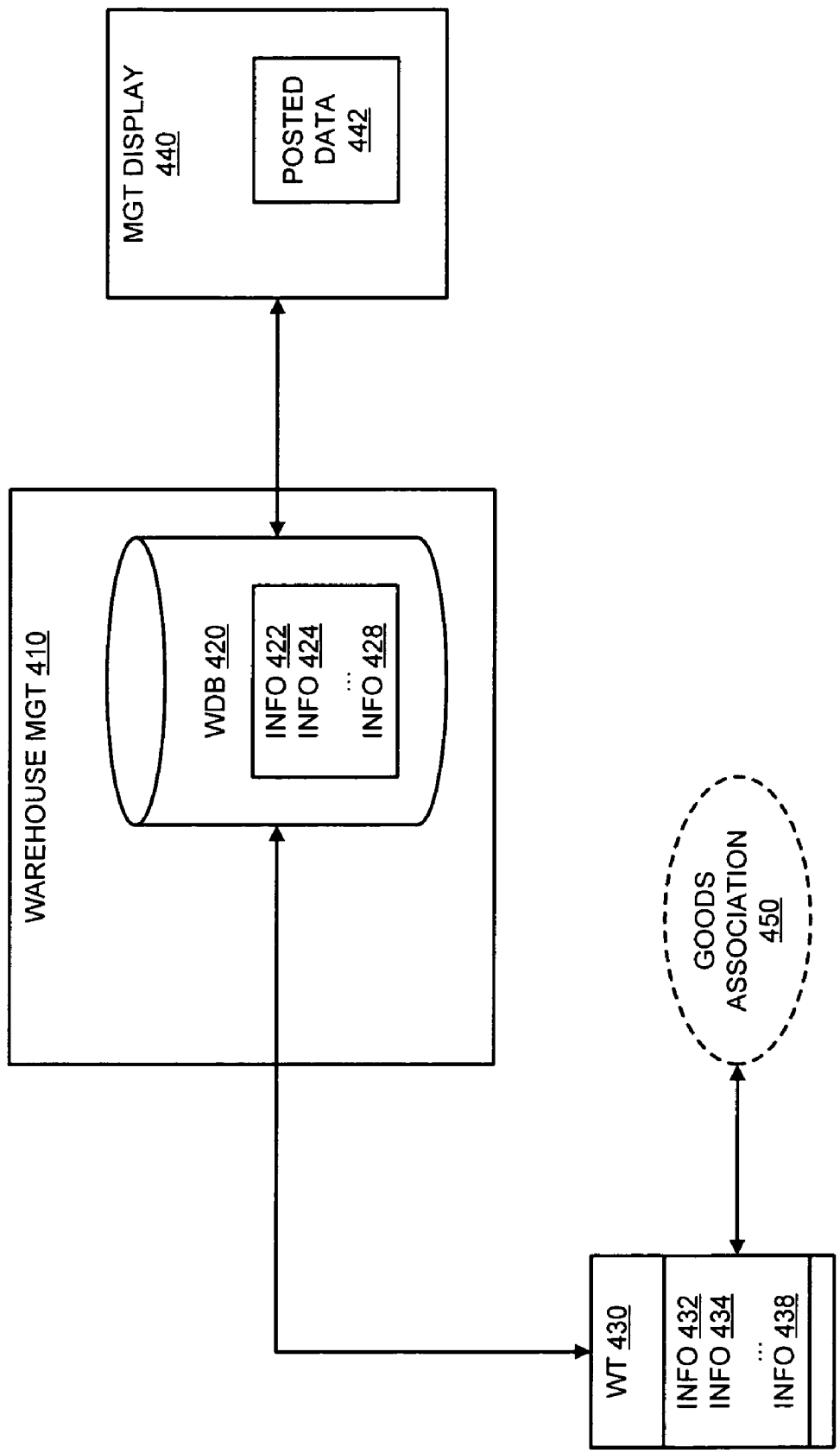
FIG. 4 is a block diagram of an embodiment of a warehouse management module receiving a warehouse task confirmation.

FIG. 4 is a block diagram of an embodiment of a warehouse management module receiving a warehouse task confirmation. Warehouse management 410 represents an example of warehouse management according to any embodiment previously mentioned. Warehouse management 410 may include warehouse database (WDB) 420, which may provide a memory location in which to store individual elements of a WT, or all information related to a WT. In one embodiment information 422-428 in warehouse database 420 represents information received from WT 430. In another embodiment information 422-428 of warehouse database 420 is used to generate WT 430. Thus, information 432-438 of WT 430 may be the same, similar, based upon, derived from, or otherwise related to information in warehouse database 420.

WT 430 may have an association with goods 450. The goods association 450 represents that WT 430 may be used to direct goods along a routing path and/or to track progress of goods on a routing path. In one embodiment goods are associated with WT 430 through an identifier in WT 430. In another embodiment warehouse management 410 identifies goods and assigns a WT to the goods, which can then be tracked.

In one embodiment WTs are confirmed along the routing path. Confirmation of a WT, or posting of WT information may provide data for display in management display 440. Management display 440 represents a program for viewing the data and/or hardware (e.g., a monitor) for viewing the data. Thus, posted data 442, which may be derived from one or more confirmed WTs may be displayed. The movement of goods from one location to another may be individually monitored by a user through the posting of information from WTs associated with individual moves from node to node until a final destination node is reached by the goods.

Figure 5A:
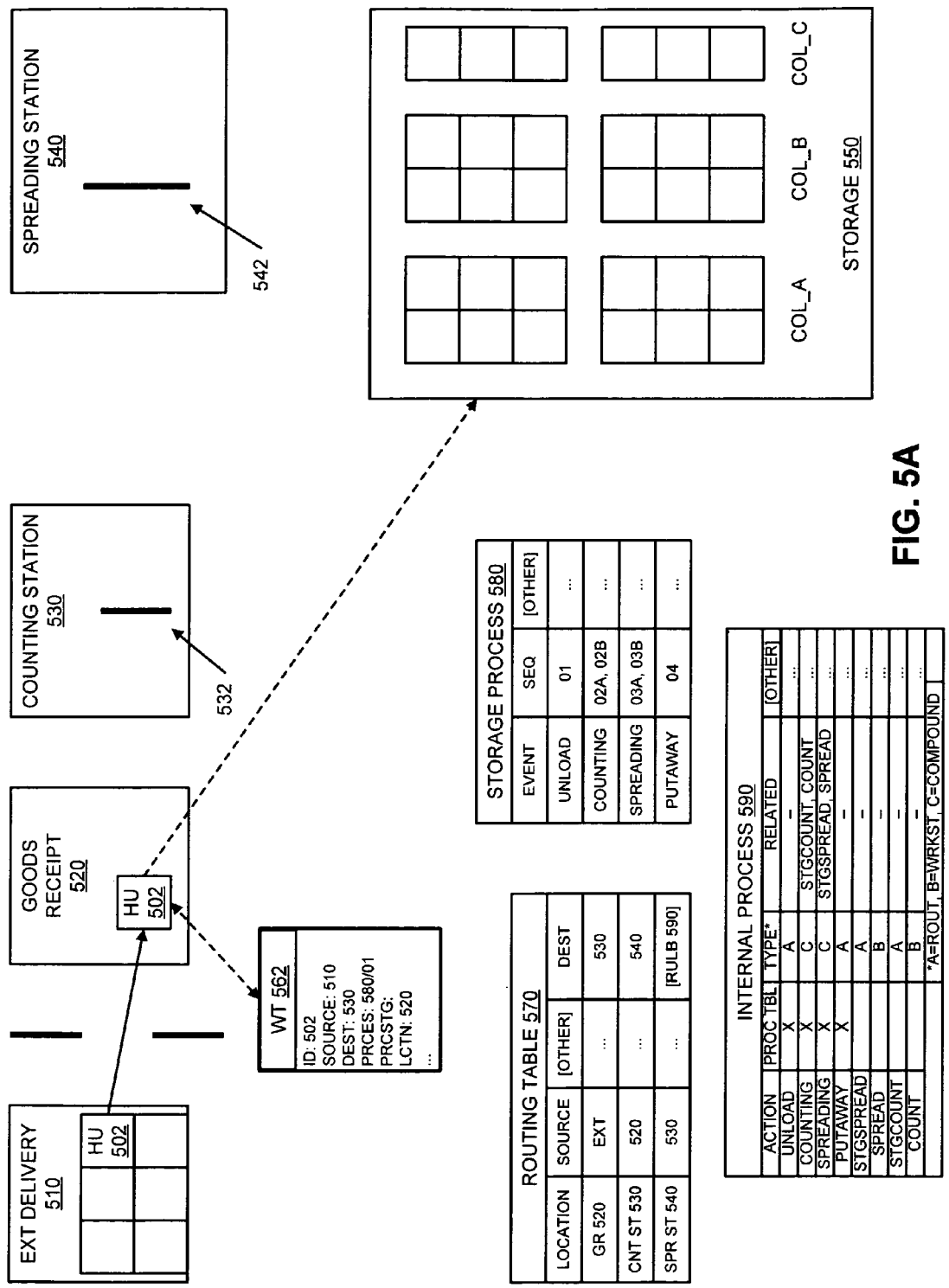
FIGS. 5A, 5B, and 5C are block diagrams of an embodiment of routing goods from receipt to storage, including warehouse task generation.
Figure 5B:
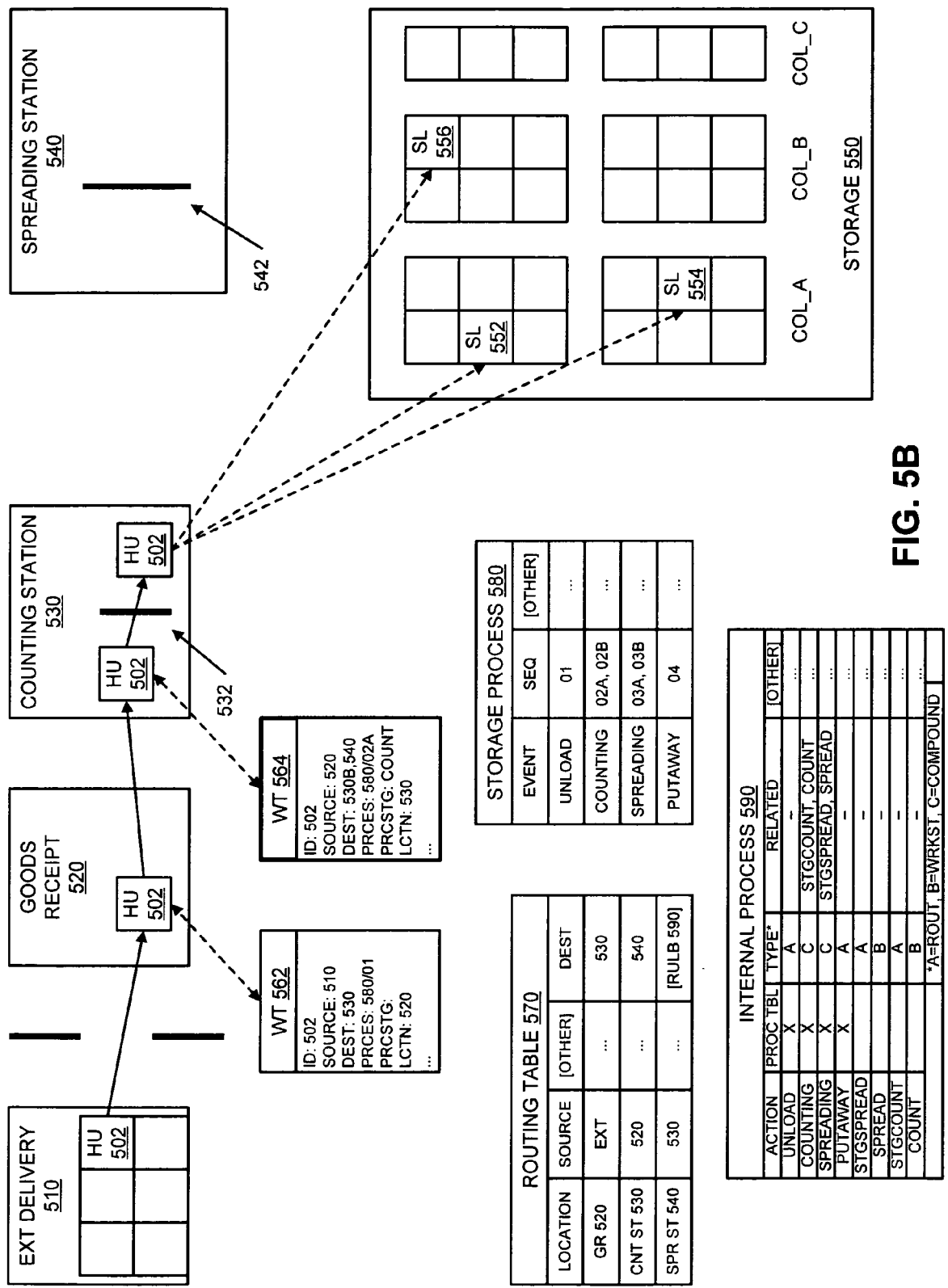
Figure 5C:
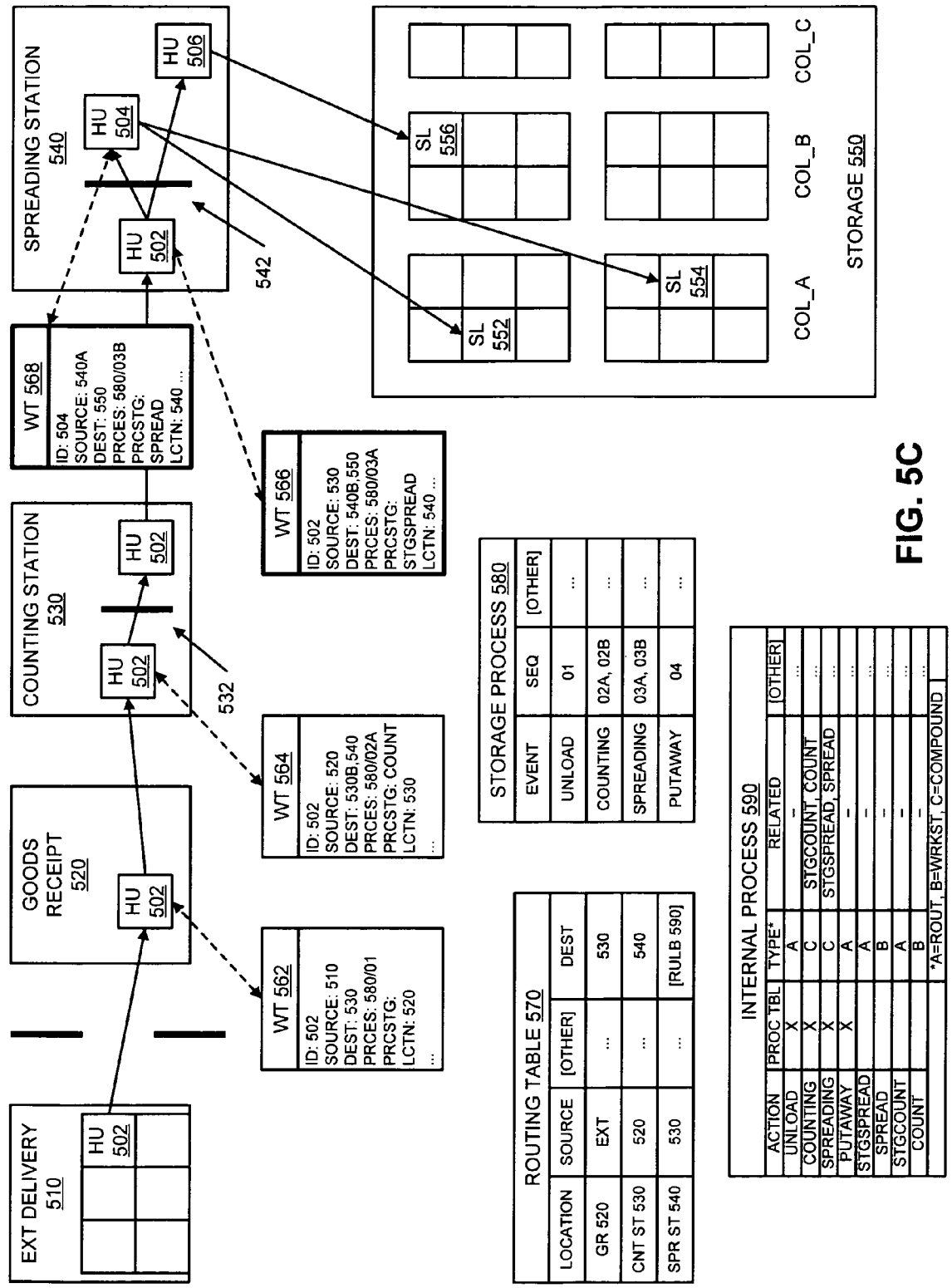

FIGS. 5A, 5B, and 5C are block diagrams of an embodiment of routing goods from receipt to storage, including warehouse task generation. With specific reference to FIG. 5A, for routing from good receipt to storage, a goods receipt move request may be generated upon arrival of the goods in external delivery 510, for example, when a truck arrives full of product(s). External delivery 510 may receive handling unit (HU) 502, the unit of goods that will be shown to be transferred within the context of this figure. HU 502 may be unloaded from external delivery 510 within a warehouse at goods receipt 520, or another comparable receive processing station. In one embodiment WT 560 is generated to indicate a move of HU 502 from goods receipt 520, a starting location, to storage 550, an ending location. WT 560 may indicate an identifier for HU 502, as indicated by the line "ID: 502" within WT 560. WT 560 may indicate an intermediate location and/or a final destination. Thus, WT 560 may indicate a next-subsequent location to which to route HU 502, and/or may indicate final destination storage 550. The other lines of information, in order, may include a source of the goods, shown as "510," which may refer to a particular supplier, or distribution center, or warehouse transfer, etc. WT 560 may also refer to the process at which the goods are currently located with respect to WT 560; specifically, to event "UNLOAD" of storage process table 580.

HU 502 and/or WT 560 of HU 502 may refer to one or more tables, sets, or groupings of information/data related to the routing of HU 502. More or fewer tables could be used, meaning the representation of tables in FIG. 5 is merely illustrative and should not be interpreted as being restrictive, exclusive, or necessary. Also, reference herein to a table refers to data in a structure or organization that may be interpreted in a consistent manner by a receiving or retrieving module. Thus, information may be referred to as "entries" or "fields," and refers to information that may be parsed or otherwise separated to indicate information about the routing of HU 502.

Routing table 570 may indicate a routing plan for received goods. Examples of information that may be found within routing table 570 include possible locations or stations or nodes within a warehouse where the goods may be routed. Although for the sake of simplicity only locations that are used for HU 502 are shown, a routing table for goods may include locations not active for a particular HU. Specifically within routing table 570 are indicated goods receipt 520, counting station 530, and spreading station 540. Routing table 570 may indicate a source for each location to determine that when an HU arrives at a particular location, it has arrived from an appropriate source. Routing table 570 may also indicate a destination for the goods from the current location. For example, when goods are at location goods receipt 520, routing table 570 indicates that the goods should have been received from external delivery 510, and should be sent to counting station 530 after processing. There may be other information included to further identify the processing to take place for the goods. Note that the destination field of spreading station 540 indicates a "rule base" (RULB), which indicates that the destination of goods from arrival at spreading station 540 is compound and reference may be made to a separate table to indicate an event that may be more complex than what can be placed within a particular entry. Specifically, the entry for the destination of spreading station 540 refers to rules base internal process table 590, which is explained in more detail below.

Storage process table 580 may refer to specific events that may occur in the routing of HU 502, and may include more or fewer entries than there are locations within routing table 570. As shown, storage process table 580 includes events "unload," "counting," "spreading," and "Putaway." The names of the events are to be understood merely as labels, which may change from one implementation to another, and should not be understood as limiting. For example, instead of an event "spreading," table 580 could indicate an event labeled "deconsolidation," which could be essentially or exactly the same as what is shown as spreading herein. In one embodiment the terms deconsolidation and spreading could be understood to be interchangeable. These process events have sequence order "01," "02A" and "02B," "03A" and "03B," and "04," respectively. As depicted, events may be further broken down into multiple subparts. Other information may be included within storage process table 580.

Internal process table 590 may refer to a table having an indication of each internal part of the routing path, which can include the subparts of each event. Thus, listing each sub-event, internal process table 590 can associate particular actions with particular events and locations within the routing path, and can provide information regarding each (which is not all shown in FIG. 5). Information shown in internal process table 590 includes an indication of actions, and whether or not the actions are also events listed on storage process table 580. Briefly, it should be noted that in practice there may be little or no difference between an "action" and an "event," and they should be understood herein merely as labels referring to something done on or with goods in conjunction with routing the goods from one location to another. The reason for the use of different labels herein is merely for purposes of ease of description and clarity in distinguishing to which table the item is related. In one embodiment a distinction may be noted that an event is related to a location, whereas an action is related to all processing that may occur on goods. Thus, under such an interpretation for purposes of one embodiment, there may be the same number or fewer events as locations, whereas there may be more actions than locations.

Internal process table 590 may include an indication of one or more related items or actions to any given action listed. Also, the type of action may be indicated: namely, whether the action relates to A) routing, B) a workstation, or C) a compound action that includes both routing and a workstation. Other information may be included within internal process table 590.

Any of tables 570-590 or any combination of them may be referenced for purposes of generating or managing a WT. Thus, when WT 560 references table 580, sequence 01, the WT is referencing the unload process. There may or may not be a process staging associated with a particular location. WT 560 may include an indication of the location of the goods with which it is associated, meaning a starting location, as though the routing path is broken down into multiple direct starting location to destination location WTs.

With more specific reference to FIG. 5B, once WT 562 is fulfilled by movement of HU 502 from goods receipt 520 to counting station 530, WT 562 may be confirmed and/or deactivated. WT 564 may be generated to be associated with the movement of HU 502 from counting station 530 to a next subsequent location in the routing path. The subsequent location in the routing path may be indicated in one or more of tables 570-590, and refers to a next area of processing. WT 564 is updated with new information to reflect the current state of the location wherein the goods are found when associated with WT 564 as the active WT. Note that counting station 530 is a compound location, and may include an action stage of "count," which may refer to verifying numbers of goods. Also, a second stage after crossing from stage A to stage B through a move down a line or a transfer to a different work bench as indicated by separation 532 may place HU 502 in, for example, a quality review location. Note that the original WT may indicate the final destination of the goods, but may be suspended from activity until the goods have passed through all other appropriate intermediate locations. After counting and identification of the goods, the particular final storage locations (SLs) 552-556 may be known, but be unavailable because the goods have other process actions that should be performed.

Thus, more particularly referring to FIG. 5C, the generation of one or more additional WTs is shown for moving the goods to their final location. WT 564 referred to destination spreading station 540, the next subsequent location in the routing path of HU 502. Upon confirmation/deactivation of WT 564 with successful passage of the goods to spreading (deconsolidation) station 540, WT 556 is generated, which identifies HU 502, and indicates staging for spreading. Staging for spreading may include removal of parts from packing, separating of goods into different packaging, etc. After passing through such a process, as indicated by 542, note that HU 502 may now be "spread" to HU 504 and HU 506, indicating that goods from HU 502 have been separated. In one embodiment the spreading of HU 502 may cause a different WT to be activated, because important information, such as an identifier or goods type may now be refer to a different HU (e.g., if a pallet ID was being tracked, and the pallet was split into cases, the case ID may now be tracked). Thus, in one embodiment multiple additional WTs 568 could be activated relative to the movement of the spread goods from one location to another. In one embodiment a WT may not fit completely within a single HU, and for example, WT 566 could be multiplied for each additional grouping of goods that results from the spreading station (e.g., if the parts are identified by part number, which could remain the same after breaking the parts into smaller units of the same part type), with each TO indicating a different, appropriate quantity. Thus, WT 568 may be associated with HU 504, and a similar WT (not shown) could be associated with HU 506.

Spreading HU 502 into HUs 504 and 506 may be for reasons of final destination. For example, storage 550 may be separated into different storage bin areas, depicted as column A, column B, and column C. In one embodiment certain items of HU 502 will be stored in locations 552 and 554 of column A, while one or more items will be stored in location 556 of column B. The difference in storage area may be sufficient reason to spread the goods for movement to storage in different processing group(s) than were used to move the goods to spreading station 540. Ultimately, according to one or more active WTs, the goods are moved to their final destination.

Figure 6A:
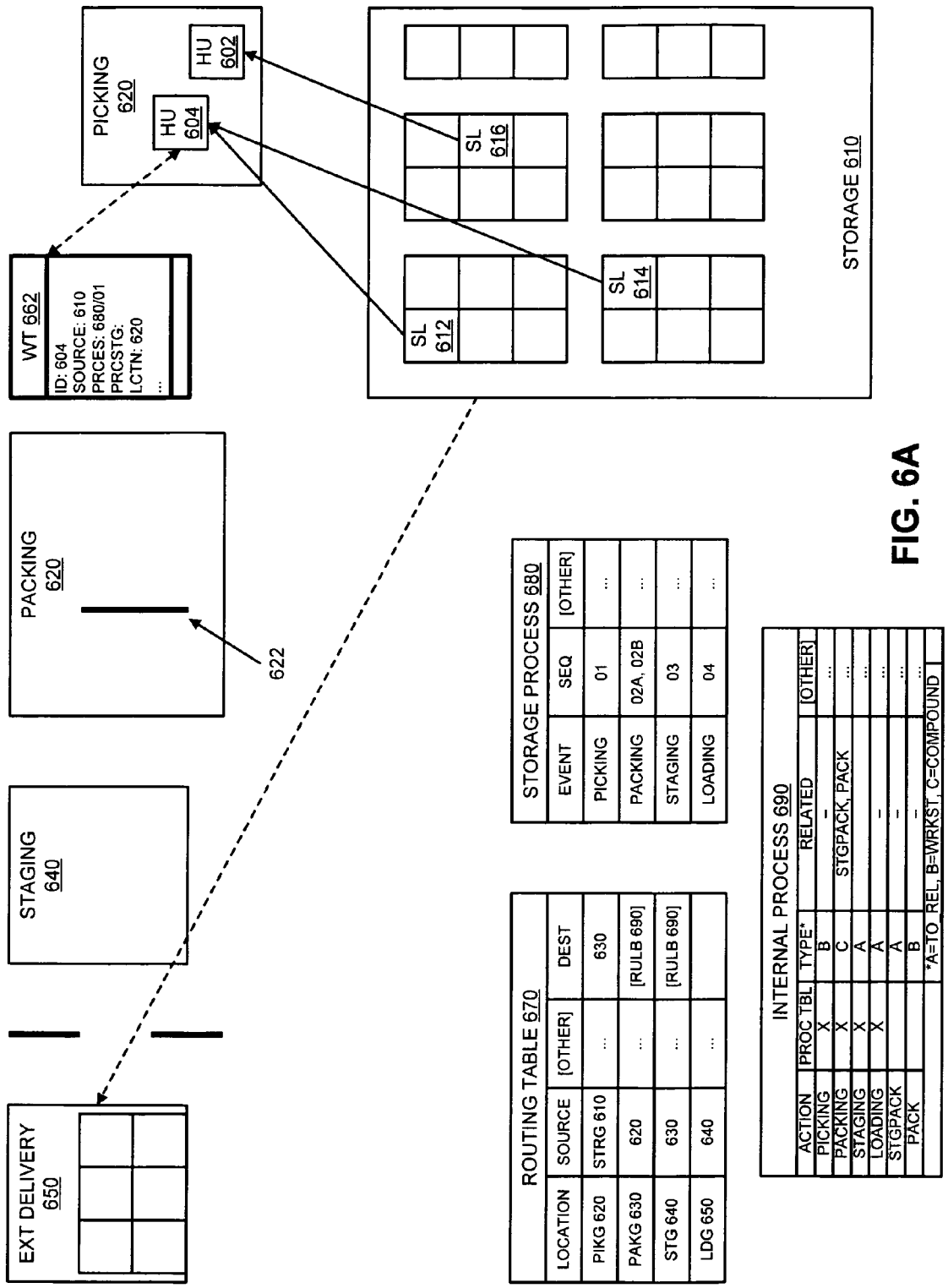
FIGS. 6A, 6B, and 6C are block diagrams of an embodiment of routing goods from storage to shipping, including warehouse task generation.
Figure 6B:
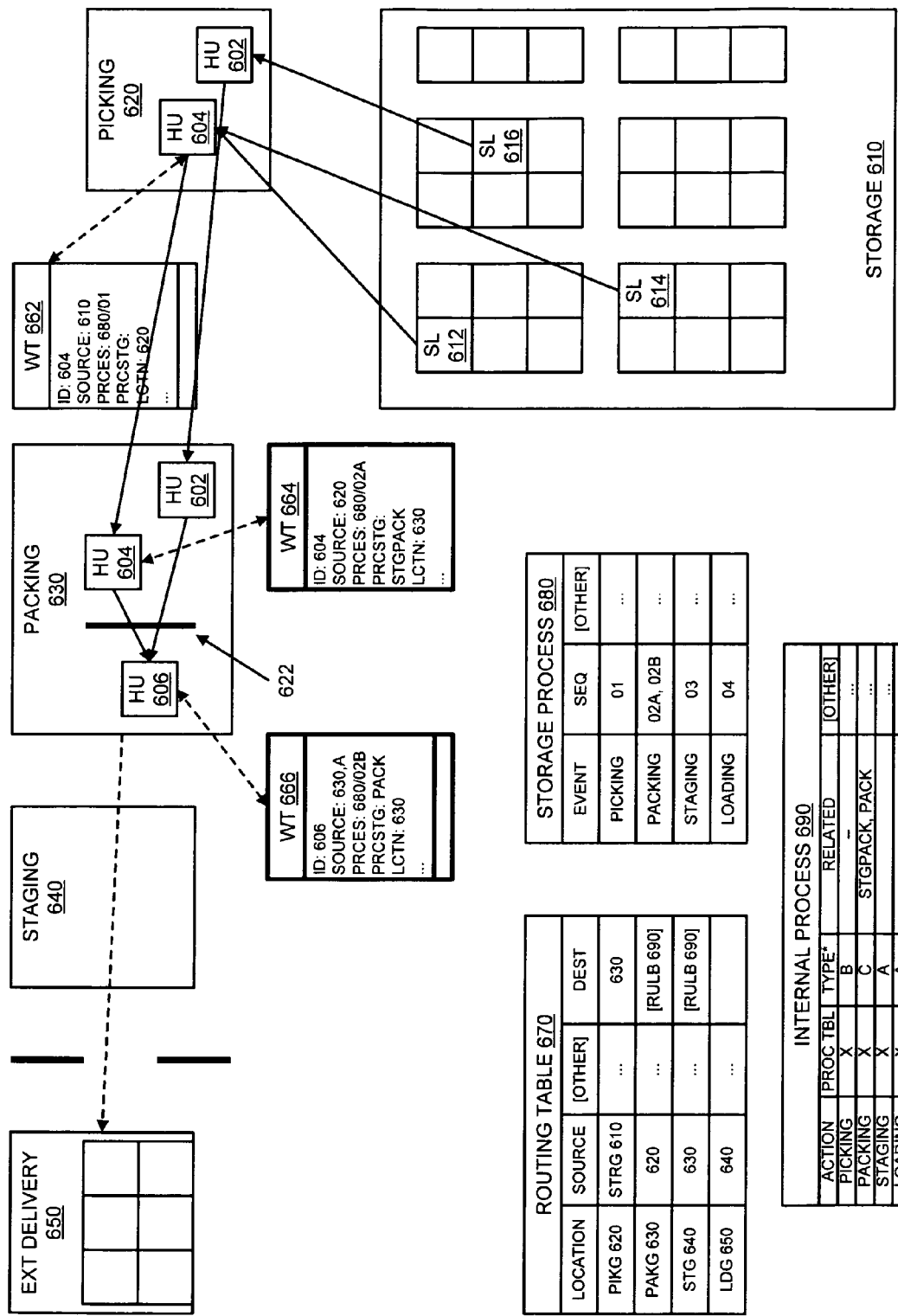
Figure 6C:
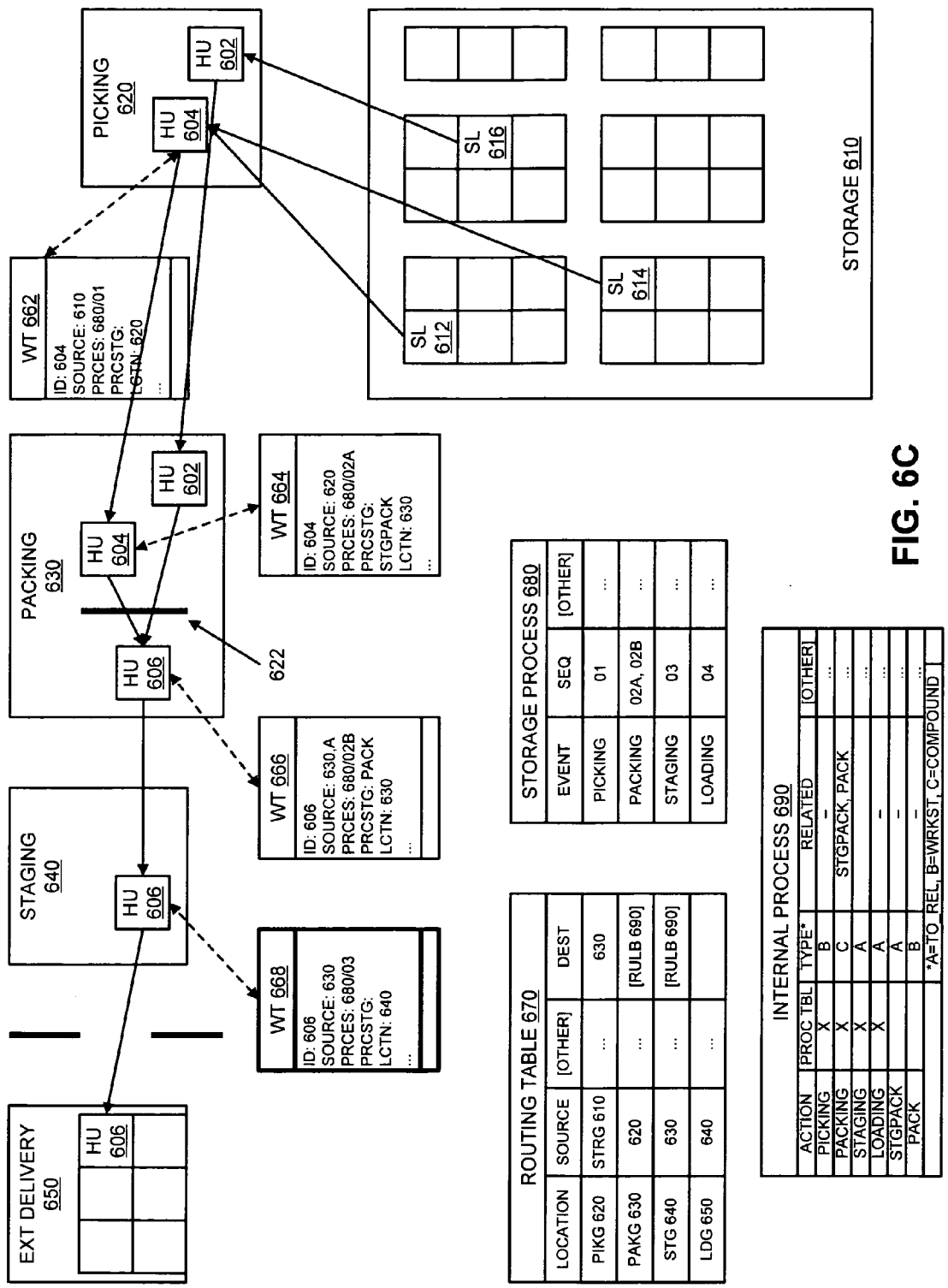

FIGS. 6A, 6B, and 6C are block diagrams of an embodiment of routing goods from storage to shipping, including warehouse task generation. Many of the items described with respect to FIGS. 5A, 5B, and 5C are applicable here, but with reference to shipping of goods, instead of with reference to goods receipt. Namely, tables 670-690 resemble tables 570-590, respectively, but have different values in their entries depending on the circumstance of the routing path for the outgoing goods.

With reference to FIG. 6A, and specifically with reference to the generation and management of WTs, a move request may be received at warehouse management to move goods from storage 610 to external delivery 650, for example, in relation to a purchase order. Thus, product should be packed and shipped to the purchaser. In one embodiment the purchase order includes goods from various locations within storage 610. Namely, storage locations (SLs) 612-616 are shown as having goods that are picked at location picking 620. Note that picking location 620 may be within the physical location of storage 610, but represents the action performed on the goods. WT 662 is shown associated with HU 604, and a similar WT may be associated with HU 602, and is omitted for purposes of simplicity in description.

With more specific reference to FIG. 6B, WT 662 may be fulfilled by movement of goods from picking 620 to packing 630, where goods can be grouped and packaged for eventual shipping. Specifically, packing 630 may include the generation and management of WT 664 associated with HU 604 at packing 630, and WT 666 associated with the packed combination of HU 602 and HU 604. WT 666 is then associated with the movement of goods to the subsequent location in the routing path. Note that other WTs, whether WT 662 that has been fulfilled and may be confirmed, or a first WT indicating the movement from storage 610 to external delivery 650, may now be confirmed and goods are moved in accordance with active WT 666.

In one embodiment of an outbound case, the WTs for movement of goods towards the final delivery destination are not created (inactive) in advance. The destination information could be kept in the delivery document itself. Because stock picked for a delivery includes a reference to the delivery for which it was picked, the system (i.e., the warehouse management) can access the delivery to determine the final destination. Thus, it may not be necessary to create an inactive WT to external delivery 650 as a routing path "preview." The delivery may include pulling the stock itself. The inbound case may be different in that the delivery document may not be able to indicate where the stock or goods will eventually end up. Thus, a product WT can be created inactive in advance to allow a routing process to determine a final destination.

With more specific reference to FIG. 6C, WT 666 is confirmed as goods arrive at the next-expected location, or a location on the routing path through which it is anticipated the goods will pass, WT 668 may be generated and associated with HU 606 for movement from staging 640 to external delivery 650. After staging 640, HU 606 can be loaded onto the implement of transport in external delivery 650 to be shipped.

As with incoming goods, the routing path and performance of actions on the goods for outgoing goods may be directed and/or indicated in tables 670-690 and the associated WTs. The WTs may likewise be affected by tables 670-690 via the generating of the WT with the information available in the tables.

Besides what is described herein, various modifications may be made to the disclosed embodiments and implementations of the invention without departing from their scope. Therefore, the illustrations and examples herein should be construed in an illustrative, and not a restrictive sense. The scope of the invention should be measured solely by reference to the claims that follow.

What is claimed is:

1. A method comprising:
  generating, in a computer, in response to a move request, a first warehouse task associated with goods, to move the goods from a source location to a final destination in a warehouse having decentralized routing control;
  determining, in the computer, an intermediate location through which to route the goods from the source location to the final destination;
  generating, in the computer, an intermediate warehouse task having an identifier for the goods, the intermediate warehouse task to indicate routing the goods from the source location to the intermediate location;
  storing the intermediate warehouse task in a memory; and
  generating a bundle for the intermediate warehouse task to move the identified goods from the source location to the intermediate location, instead of generating a bundle according to the first warehouse task to move the goods from the source location to the final destination.

2. The method of claim 1, wherein generating the first warehouse task to move the goods from the source location in response to the move request comprises:

generating the first warehouse task in response to a goods receipt request to move the goods from a receiving area to a storage point.

3. The method of claim 1, wherein generating the first warehouse task to move the goods from the source location in response to the move request comprises:

generating the first warehouse task in response to a purchase order request to move the goods from a storage bin to a shipping area.

4. The method of claim 1, wherein generating the first warehouse task to move the goods from the source location in response to the move request comprises:

generating the first warehouse task in response to a picking station move request.

5. The method of claim 1, wherein determining the intermediate location comprises:

accessing a routing table to obtain an indicated intermediate location.

6. The method of claim 1, wherein determining the intermediate location comprises:

determining the intermediate location based at least in part on a layout-oriented routing plan, the layout-oriented routing plan to indicate an intermediate location according to a physical layout of areas in the warehouse.

7. The method of claim 6, wherein determining the intermediate location based on the layout-oriented routing plan further comprises:

determining for the first warehouse task whether the goods are permitted to be moved directly from the source location to the final destination, according to the warehouse layout;

if moving the goods directly from the source location to the destination is not permitted, generating the intermediate warehouse task to an intermediate location permitted to receive goods from the source location; and creating the bundle for the intermediate warehouse task to move the goods from the source location to the intermediate location.

8. The method of claim 7, further comprising:

repeating the determining, generating, and creating from the intermediate location with respect to the final destination.

9. The method of claim 1, wherein determining the intermediate location comprises:

determining the intermediate location based at least in part on a process-oriented routing plan, the process-oriented routing plan to indicate an intermediate location according to a standard movement process.

10. The method of claim 9, wherein determining intermediate location based on the standard movement process of the process-oriented routing plan comprises:

identifying a type of the goods to be moved; and
identifying a movement based at least in part on the type identified.

11. The method of claim 9, wherein determining the intermediate location based on the process-oriented routing plan further comprises:

determining for the goods whether an intermediate location of a global routing plan is active for the goods; and if the intermediate location is active for the goods, generating the intermediate warehouse task for the goods from the source location to the intermediate location;

otherwise generating the intermediate warehouse task for the goods from the source location to an active intermediate location.

12. The method of claim 1, wherein generating the first warehouse task comprises:

generating an inactive first warehouse task; and further comprising:

activating the first warehouse task in response to determining a subsequent location is the final destination.

13. An article of manufacture comprising a non-transitory machine-accessible storage medium having content, which when accessed provides instructions to cause a machine to perform operations including:

generating, in response to a move request, a first warehouse task associated with routing goods from a source location to a final destination in a warehouse having decentralized routing control;

accessing a routing plan to determine an intermediate location through which to route the goods from the source location to the final destination;

generating an intermediate warehouse task associated with routing a handling unit of the goods from the source location to the intermediate location;

generating a bundle for the intermediate warehouse task to move the handling unit of the goods from the source location to the intermediate location, instead of generating a bundle for the first warehouse task to move the goods from the source location to the final destination.

14. The article of manufacture of claim 13, wherein the intermediate location comprises a processing node of the warehouse.

15. The article of manufacture of claim 14, wherein the processing node comprises at least one of a spreading station, a picking point, or a splitting station.

\* \* \* \* \*